UNITED STATES PATENT OFFICE.

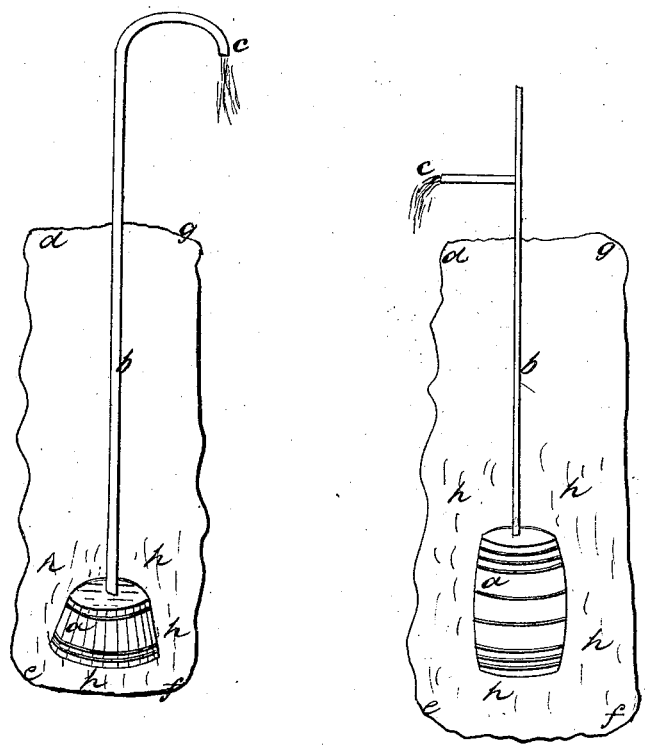

ANSON WOLCOTT, OF EAST BLOOMFIELD, NEW YORK.

METHOD OF TREATING SURFACE SPRINGS.

Specification of Letters Patent No. 14,623, dated April 8, 1856.

*To all whom it may concern:*

Be it known that I, ANSON WOLCOTT, of East Bloomfield, in the county of Ontario and State of New York, have invented a new, useful, and improved mode of preserving pure and available the water of such springs and fountains as naturally appear and show themselves at the surface of the ground and of preventing damage from them—that is to say, a new and improved method of keeping animals and insects from getting into the water of such springs or fountains, and of keeping surface water, mud, or impurities from getting into such springs or fountains, and of preventing the water of such springs and fountains from saturating the soil or earth around the same, where such saturation is deemed a waste of the water, or injurious to agriculture, or to the soil, or unsafe to stock, or unhealthy, or unpleasant, or for any reason not desirable, and of obtaining from such springs or fountains a supply of water where it is needed, and of preventing such springs or fountains from being obstructed by mud, ice, leaves, dirt, snow, or cold, or by plowing or treading of animals, and of preventing their being miry, or dangerous or unpleasant to men or animals, and of saving the water of such springs or fountains from absorption, waste, evaporation, heat, cold, or discharge, except at the place desired, and of retaining the same for transmission by hydraulic rams, machinery, descent, flow, or other known means to the place desired, and of avoiding sediment and impurities in the water from such fountains and springs which might otherwise obstruct or hinder such rams, machinery, descent, flow, or other means of transmission or render the water less valuable.

The nature of my invention consists in applying, by some sufficiently water-tight and substantial means, the large open end or orifice of a tube or hollow conductor (made in suitable proportion to the size of the spring or fountain) around and over the orifice of such a spring or fountain at a place where, upon excavation or otherwise, it is found to flow through a sufficiently hard or impervious substance so as to prevent the escape of the water, or its absorption, except by its passing through said tube or hollow conductor, thus capping such spring or fountain instead of tapping it, the tube or hollow conductor having its other end open, (or a suitable orifice,) at the place where the discharge of the water is desired to be, and also in contracting the size of the tube or hollow conductor, at a point sufficiently below or protected from the influence of the weather, to such a caliber or dimensions, and before its opening into the open air, or into other passageways, receptacles or streams,—as shall secure the above results or so many of them as may be desirable and practicable in any particular locality.

To enable others skilled in the art or science to which it appertains or with which it is most nearly connected, to make, construct and use my invention, I will proceed to describe its construction and operation.

First, I excavate about the spring or fountain, in whatever direction the orifice of the channel or current may lead, and following in opposition to the current, to and at a place where the same is found to flow through hard subsoil or clay or other sufficiently hard and impervious and impermeable substance so as to prevent the flow or rapid absorption of the water of the spring or fountain by or through such surrounding soil or substance. This excavation is represented in the annexed drawings by *d, e, f, g,* and must be sufficiently larger than the tube, vessel, or conductor "*a*," below named so as to permit the easy and proper application of clay, cement, or other substance or pressure as below named, outside of and around said tube or vessel. I next provide a hollow, tight and substantial vessel, tube or hollow conductor ("*a*," as represented in the annexed drawing,) of any suitable material, with a large orifice or opening sufficient entirely to cover and surround the spring or channel at the place so as above named, and extending so far from the outer edge of the orifice of the spring or channel (or springs or channels when there is more than one and near together,) as to prevent the caving or natural wear of the orifice of the spring from extending beyond or outside of the said large orifice or opening in said tube, vessel or hollow conductor "*a*," so capping said spring or fountain as below named. This tube, vessel or conductor "*a*," should be furnished with another orifice or opening for conducting the water of the spring or fountain through and away from it, but should not be continued its full size to the surface of the ground or other unprotected position, when it is desired to guard against stoppage or damage by freezing or against the influence of changes of temperature of the weather, as in that case there would not be sufficient current through it to prevent freezing and there would be too much surface which would absorb heat in summer; but the size of the tube, vessel or hollow conductor "a" should be diminished at a point sufficiently below the influence of the weather, to a size not much more than sufficient for the ready transmission and flow of the amount of water yielded by the spring or fountain, and the tube, conductor or vessel wherever exposed to the temperature of the weather should not much exceed that size. Nor should the upper or outer orifice ("c,") be as large as the one first named, nor much larger than sufficient for the ready transmission and flow of the water yielded by the spring or fountain, when it is desirable to prevent evaporation or heat or the intrusion of insects or animals.

The top of the large part of the tube, vessel or conductor, "a," should I think be covered at least three feet below the surface of the ground to guard against the weather, and such large part should also be sufficient in height so as to prevent earth or sediment from readily rising or being carried into the smaller part of such tube, vessel or conductor. A vessel as capacious as a hogshead would I think be preferable in most cases, but depending, as to its size, upon the size and nature of the spring. If the vessel be large it had better be strengthened by props or stays inside, across from side to side, and also propping its upper parts by bracing from its sides to such upper parts. These stays or braces may be of any suitable stiff material, and fastened in any usual or convenient way. If the vessel be of wood these stays or braces may be of wood or other stiff material, and nailed or otherwise fastened at their ends. The smaller orifice "c" should be furnished with a means permanent or transient of conducting the water away from said excavation during the time of the construction and placing of the invention, or else a pump or other means during that time should be employed, to remove the water from and carry it beyond the excavation so that the construction and placing of the invention as below named shall not be prevented by the water in the excavation. I then place the large orifice of the said vessel, tube or conductor "a" over and around the orifice of the spring or fountain, thus completely capping thereby, the spring or fountain. Clay, cement, or other sufficiently impermeable and impervious, ponderous, or adhesive substance is then placed, cast, thrown, tamped or driven around the edges and sides of the said tube, vessel or conductor "a," and upon it, so as to connect it sufficiently water-tight with the soil or other impervious substance as above, through which the said spring or fountain was as above found to flow, and so as, by imperviousness or pressure or both, effectually to prevent the escape or rapid transmission of water from the spring or channel except through the said tube, vessel or conductor "a" by way of its second orifice ("c,") above named. This clay, cement or other material is represented in the annexed drawings by "$h, h, h, h$." The remainder of the excavation may then be filled in by any material convenient, but sufficient with the filling or substance last named to protect the water in the large part of the tube, vessel or conductor "a" from the influence of changes in the temperature of the weather, where that is deemed important. The said second orifice ("c") may be at the place and distance at which the water is to be delivered, and either above or below the surface of the ground as may be desirable or most convenient, and the water being thus confined to a passage through the vessel, tube or conductor "a," may be conducted to a trough, reservoir, ram, race-way or drain—according to the spring and locality and the object for which the invention is applied—by any usual or known means.

I have in practice found a tight barrel, with the lower head removed to form the large orifice or opening of the tube, conductor or vessel "a," and an ordinary pump log, with a two inch caliber, communicating with its interior through its sides or other head, for the smaller orifice—a convenient arrangement for the tube, conductor or vessel "a." An inverted tub or half barrel or hogshead or half hogshead, with the smaller tube "b" of any proper material, would answer the same purpose. See "a," "b," in annexed drawings. And I have found clay, carefully rammed home and surrounding and covering the entire barrel several inches thick, say ten or more, a sufficient and cheap and useful stopping around and upon the tube, conductor or vessel "a" at $h\ h\ h\ h$. In an application of the invention upon the petitioner's farm in East Bloomfield, the water rises of itself through the tube "a" "b" fourteen feet perpendicular height above the lower orifice of "a," and seven feet perpendicular height above the natural surface of the ground at "d" "g."

I am aware that placing an open barrel or box so as to surround a spring is not new, but in that case it does not admit of covering the same with earth, nor remedy the evil of soft earth or miry margins to springs; nor do they prevent surface water with its impurities nor insects from entering; nor prevent changes of temperature consequent to said open springs. I am also aware that closed cisterns for retaining water introduced into them are not new. I therefore do not claim any of those methods. But What I do claim as my invention and desire to secure by Letters Patent is—

The use of an inverted vessel constructed with an edge susceptible of being forced into the clay pan through which the spring issues, said vessel provided with a discharge pipe for the purpose of capping springs, so as to admit of surrounding and covering the inverted vessel with clay substantially as described.

ANSON WOLCOTT.

Witnesses:
MYRON O. WILDER,
H. METCALF.